(12) United States Patent
Van Horn et al.

(10) Patent No.: US 9,062,236 B2
(45) Date of Patent: Jun. 23, 2015

(54) RANDOM COPOLYMER OIL RETURN AGENTS

(75) Inventors: Brett L. Van Horn, King of Prussia, PA (US); Christopher A. Bertelo, Doylestown, PA (US); Scott C. Schmidt, Woodbury, MN (US); Noah E. Macy, Royersford, PA (US); George J. Papakonstantopoulos, King of Prussia, PA (US)

(73) Assignee: Arkema Inc., King of Prussia, PA (US)

( * ) Notice: Subject to any disclaimer, the term of this patent is extended or adjusted under 35 U.S.C. 154(b) by 238 days.

(21) Appl. No.: 13/504,173

(22) PCT Filed: Oct. 27, 2010

(86) PCT No.: PCT/US2010/054180
§ 371 (c)(1),
(2), (4) Date: May 25, 2012

(87) PCT Pub. No.: WO2011/053610
PCT Pub. Date: May 5, 2011

(65) Prior Publication Data
US 2012/0223269 A1    Sep. 6, 2012

Related U.S. Application Data

(60) Provisional application No. 61/257,154, filed on Nov. 2, 2009.

(51) Int. Cl.
*C09K 5/04* (2006.01)
*C10M 145/14* (2006.01)
*C10M 171/00* (2006.01)

(52) U.S. Cl.
CPC ............. *C09K 5/045* (2013.01); *C09K 2205/12* (2013.01); *C10M 171/008* (2013.01); *C10M 2203/1025* (2013.01); *C10M 2203/1045* (2013.01); *C10M 2203/1065* (2013.01); *C10M 2205/0285* (2013.01); *C10M 2205/143* (2013.01); *C10M 2205/223* (2013.01); *C10M 2207/2835* (2013.01); *C10M 2209/084* (2013.01); *C10N 2220/021* (2013.01); *C10N 2220/302* (2013.01); *C10N 2220/303* (2013.01); *C10N 2240/30* (2013.01)

(58) Field of Classification Search
CPC ....... C09K 5/045; C09K 5/00; C10M 145/14; C10M 2209/084; C10M 2209/0845
USPC ............ 252/68, 67, 69; 62/114, 502; 508/469
See application file for complete search history.

(56) References Cited

U.S. PATENT DOCUMENTS

| | | | |
|---|---|---|---|
| 5,547,593 A * | 8/1996 | Sanechika et al. | 508/207 |
| 6,299,792 B1 * | 10/2001 | Feiring et al. | 252/68 |
| 8,454,853 B2 * | 6/2013 | Van Horn et al. | 252/68 |
| 8,623,235 B2 * | 1/2014 | Van Horn et al. | 252/68 |
| 2007/0082827 A1 * | 4/2007 | Schmidt et al. | 508/469 |
| 2010/0101245 A1 * | 4/2010 | Bivens et al. | 62/77 |
| 2011/0006248 A1 * | 1/2011 | Van Horn et al. | 252/68 |
| 2011/0012052 A1 * | 1/2011 | Van Horn et al. | 252/68 |
| 2013/0246288 A1 * | 9/2013 | Van Horn et al. | 705/308 |

* cited by examiner

Primary Examiner — Douglas McGinty
(74) Attorney, Agent, or Firm — Steven D. Boyd

(57) ABSTRACT

The present invention relates to polymeric oil-return agents which solubilize or disperse mineral oil and/or synthetic oil lubricants with hydrofluorocarbon, hydrochlorofluorocarbon, and hydrofluoroolefin-based refrigerants and refrigerant compositions containing them. The polymeric oil-return agents are random copolymers containing less than about 30 wt % fluorine and produced from at least one monomer providing compatibility with the oil phase and at least one monomer providing compatibility with the refrigerant phase. The polymeric oil-return agents provide for more efficient return of mineral oil and/or synthetic oil lubricants from non-compressor zones back to a compressor zone in a refrigeration system.

20 Claims, No Drawings

RANDOM COPOLYMER OIL RETURN AGENTS

FIELD OF THE INVENTION

The present invention relates to polymeric oil-return agents which solubilize or disperse mineral oil and/or synthetic oil lubricants with hydrofluorocarbon, hydrochlorofluorocarbon, and hydrofluoroolefin-based refrigerants and refrigerant compositions containing them. The polymeric oil-return agents are random copolymers containing less than about 30 wt % fluorine and produced from at least one monomer providing compatibility with the oil phase and at least one monomer providing compatibility with the refrigerant phase. The polymeric oil-return agents provide for more efficient return of mineral oil and/or synthetic oil lubricants from non-compressor zones back to a compressor zone in a refrigeration system.

BACKGROUND OF THE INVENTION

Most refrigeration compressors use mineral oil lubricants with chlorofluorocarbon (CFC) and hydrochlorofluorocarbon (HCFC) refrigerants. In addition to being inexpensive and rugged lubricants, mineral oils are miscible with CFCs and HCFCs, which is important in providing good oil return. In a system with poor oil return, the oil that leaves the compressor collects at various points in the refrigeration system and does not return to the compressor, leading to clogging, poor lubrication, and decreased efficiency.

With the continued regulatory pressure limiting the use of ozone depleting substances, the refrigeration industry has been moving to non-ozone depleteing hydrofluorocarbon (HFC) based refrigerants. HFCs, however, lack the miscibility with traditional lubricants such as mineral oils necessary to provide adequate performance. This has resulted in the implementation of oxygenated lubricants such as polyol ester (POE) oil, polyalkylene glycol (PAG) oil, and polyvinyl ether (PVE) oil. These new lubricants can be considerably more expensive than traditional mineral oil lubricants and can be extremely hygroscopic. Their combination with water can result in the undesirable formation of acids that can corrode parts of the refrigeration system and lead to the foramtion of sludges. Consequently, there is a need and opportunity to resolve this low solubility and oil return problem so that the refrigeration industry may utilize HFC-based refrigerants with mineral oil and/or oxygenated lubricants.

The present invention addresses these needs of the refrigeration industry by providing polymeric oil-return agents which create a solution or stabilized dispersion of lubricant oil (dispersed phase) in a HFC, HFO, and/or HCFC-based refrigerant (continuous phase), permitting improved lubricant oil transport through a refrigeration system and lubricant oil return back to the refrigeration system compressor from other refrigeration system zones. The polymeric oil-return agents of the present invention are effective when used in combinations with conventional mineral oils and/or oxygenated oils.

U.S. Pat. No. 6,516,837 discloses the use of surfactants and solubilizing agents with environmentaly desirable refrigerants in systems where chlorine containnig refrigerants are being replaced with non-chlorine containng refrigerants. The patent discloses that the surfactants/solubilizing agents are needed because many non-chlorine-containing refrigerants, including HFC's, are relatively insoluble and/or immiscible in the types of lubricants traditionally used such as mineral oil and alkylbenzenes or polyolefins. The patent discloses that the surfactants may include polymers, preferably of polyoxyethylene-type nonionic surfactants, or copolymers of methacrylates with N-substituted compounds; copolymers which incorporate polyester linkages, and the like.

U.S. Pat. No. 6,299,792 discloses the use of combinations of surfactants and solubilizing agents additives as oil return agents for refrigeration systems.

SUMMARY OF THE INVENTION

The present invention provides for polymeric oil-return agents that increase the miscibility of lubricants such as mineral oils and/or oxygenated lubricants with halogenated refrigerants, including hydrofluorocarbon (HFC) and hydrofluoroolefin (HFO) refrigerants, in order to improve oil return and system performance of refrigeration systems. It was discovered that random copolymers containing less than about 30 wt % fluorine can effectively compatibilize mineral oils and/or oxygenated lubricant oils with HFC refrigerants. It was discovered that the polymeric oil-return agents of the present invention could be suddessfully used to improve the misciblity and oil-return in systems of non-chlorine-containing refrigerants and non-oxygenated lubricants without the need of the solubilizing agents. The random copolymers comprise at least one monomer, A, providing compatibility with the oil phase, and at least one monomer, B, providing compatibility with the refrigerant phase.

DETAILED DESCRIPTION OF THE INVENTION

The present invention is directed toward the use of random copolymers containing less than about 30 wt % fluorine, preferably less than about 15 wt %, more preferably less than about 5 wt % and most preferably essentially free of fluorine as oil-return agents in combination with halogenated hydrocarbons such as hydrofluorocarbons, hydrofluoroolefins and mixtures thereof in refrigerant systems. The halogenated hydrocarbon preferably contains from about 1 to 4 carbon atoms. The hydrofluorocarbon is preferably selected from difluoromethane, 1,1-difluoroethane, 1,2-difluoroethane, 1,1,1,2-tetrafluoroethane, 1,1,2,2-tetrafluoroethane, 1,1,1-trifluoroethane, 1,1,2-trifluoroethane, 1,1,1,2,2-pentafluoroethane, 1,1,1,3,3-pentafluoropropene, 1,1,1,2,3,3,3-heptafluoropropene, fluorocyclopropane, 1,1-difluoroeyclopropane, 1,1,2-trifluorocyclopropane, 1,1,2,2-tetrafluorocyclopropane, 1-trifluoromethyl-1,2,2-trifluorocyclopropane, and mixtures thereof, more preferably selected from difluoromethane, 1,1,1,2-tetrafluoroethane, 1,1-difluoroethane, 1,1,1-trifluoroethane, pentafluoroethane, 1,1,1,3,3-pentafluoroethane, and mixtures thereof. The hydrofluoroolefin is preferably selected from 3,3,3-trifluoropropene, 2,3,3,3-tetrafluoropropene, E-1,3,3,3-tetrafluoropropene, Z-1,3,3,3-tetrafluoropropene, E-1,2,3,3,3-pentafluoropropene, Z-1,2,3,3,3-pentafluoropropene, E-1,1,1,4,4,4-hexafluorobut-2-ene, Z-E-1,1,1,4,4,4-hexafluorobut-2-ene, 1,1,1,2,4,4,4-heptafluorobutene, and mixtures thereof, more preferably selected from 3,3,3-trifluoropropene, 2,3,3,3-tetrafluoropropene, E-1,3,3,3-tetrafluoropropene, and mixtures thereof. The refrigerant composition can optionally include a hydrocarbon such as propane, butane, isobutane, normal pentane, neopentane, cyclopentane, isopentane, and mixtures thereof. The refrigerant composition can optionally include dimethyl ether.

By essentially free is meant that fluorine is not intentionally included in the copolymer although small amounts may be present.

Preferable random copolymers comprise acrylate and/or methacrylate monomers. More preferred are random copolymers are those where A comprises monomers selected from C8 to C16 acrylate and methacrylate monomers, more preferably lauryl methacrylate and/or lauryl acrylate, and where B comprises monomers selected from C2 to C8 acrylate and methacrylate monomers, more preferably butyl acrylate.

The random copolymer oil-return agent is made up of two different monomers selected from acrylates having alkyl end group of from one to sixteen carbons, methacrylates having alkyl end group of from one to sixteen carbons, or mixtures thereof. The polymeric oil-return agent preferably are made up of an acrylate monomer having an alkyl group of from one to eight carbons and (b) an acrylate monomer and/or methacrylate monomer having an alkyl group of from eight to sixteen carbons.

The ratio of acrylate monomers to acrylate and/or methacrylate monomers can range from about 1:20 to 20:1, preferably from about 1:10 to 2:1 and more preferably from about 1:10 to 1:1. The polymeric oil-return agent has an average molecular weight of from about 1 kg/mol to about 50 kg/mol preferably from about 1 kg/mol to about 20 kg/mol.

The random copolymers of the present invention are preferably those formed by traditional free radical polymerization. The random copolymers comprise at least one monomer, A, providing compatibility with the oil phase, and at least one monomer, B, providing compatibility with the refrigerant phase.

The present invention is directed towards use of such copolymers as additives to compatibilize lubricating oils with refrigerants and also towards compositions comprising oil and additive as either an additive concentrate or as a lubricant composition; compositions comprising oil, additive, and refrigerant; the use of such additives. In compositions comprising oil and additive, the present invention is directed towards lubricant compositions comprising oil and additive with an amount of additive effective at increasing the miscibility or solubility of refrigerant with oil, preferably between about 0.01 and 99 wt % additive in oil, more preferably between about 0.1 and 75 wt % additive in oil, even more preferably between about 0.2 and 20 wt % additive in oil, more preferably between about 0.4 and 15 wt % additive in oil more preferably between about 1.0 and 10 wt % additive in oil and even more preferably between 2 and 8 wt % in additive in oil. Where an additive concentrate in oil is desired, as in a mixture to be added to a refrigerant containg system, the preferred compositions would be from about 10 wt % to about 80 wt % additive in oil.

The compositions of the present invention can also comprise additional components such as viscosity modifiers, antioxidants, stabilizers, dyes, anti-foaming agents, foaming agents, surfactants, nanoparticles, corrosion inhibitors, radical scavengers, other lubricants, etc.

In making the random copolymers of the present invention, any polymerization technique familiar to those skilled in the art can be used. The preferred method is free radical polymerization.

The present compositions comprising halogenated hydrocarbons and random copolymer oil-return agent also find utility as cleaning agents to remove hydrocarbon oils and soldering fluxes from solid surfaces. Halogenated hydrocarbons may have limited oil solubility. Addition of the random copolymer oil-return agents of the present invention to such halogenated hydrocarbons enhances the ability of halogenated hydrocarbons, particularly hydrofluorocarbons, to at least partially dissolve and thus remove oil and soldering fluxes from surfaces.

Thus, the present invention is further related to processes for vapor phase degreasing and solvent cleaning using the present compositions comprising halogenated hydrocarbons and random copolymer oil-return agents. Such vapor degreasing processes comprise contacting a substrate to be cleaned, e.g., residue contaminated silicon-metal composite electronic circuit boards, metal (e.g. stainless steel) fabricated parts and the like, with the present halogenated halocarbonl random copolymer oil-return compositions in a liquid phase, and further, the halogenated hydrocarbon vapors resulting from boiling such compositions. Halogenated hydrocarbon vapors condensing on the substrate provide clean distilled halogenated hydrocarbon which further rinses away remaining oil-return agent and flux or other residue. Evaporation of halogenated hydrocarbon from the substrate leaves behind no residue. The present solvent cleaning processes comprises contacting a substrate to be cleaned with liquid phase composition of the present invention comprising halogenated hydrocarbons and random copolymer oil-return agent and then removal of the substrate from the composition. For difficult to remove soils and oils where elevated temperature is necessary to improve the cleaning action of the solvent, or for large volume assembly line operations where the cleaning of substrates must be done efficiently and quickly, the conventional operation of a vapor degreaser consists of immersing the part to be cleaned in a sump of boiling solvent which removes the bulk of the soil, thereafter immersing the part in a sump containing freshly distilled solvent near room temperature, and finally exposing the part to solvent vapors over the boiling sump which condense on the cleaned part. In addition, the part can also be sprayed with distilled solvent before final rinsing. Vapor degreasers suitable in the above-described processes are well known in the art. For example, Sherliker et al. in U.S. Pat. No. 3,085,918, disclose such suitable vapor degreasers comprising a boiling sump, a clean sump, a water separator, and other ancillary equipment.

The present compositions comprising halogenated hydrocarbons and random copolymer oil-return agents are effective in removing hydrocarbon oil and soldering flux residues from a broad range of substrates including metals, such as tungsten, copper, gold, beryllium, stainless steel, aluminum alloys, brass and the like; from glasses and ceramic surfaces, such as glass, sapphire, borosilicate glass, alumina, silica such as silicon wafers used in electronic circuits, fired alumina and the like; and from plastics such as polyolefin ("Alathon", RYNITE®, "Tenite"), polyvinylchloride, polystyrene ("Styron"), polytetrafluoroethylene (TEFLON®), tetrafluoroethylene-ethylene copolymers (TEFZEL®), polyvinylidenefluoride (KYNAR®), ionomers (SURLYN®), acrylonitrile-butadiene-styrene polymers (KRALAC®), phenol-formaldehyde copolymers, cellulosic ("Ethocel"), epoxy resins, polyacetal (DELRIN®), poly(p-phenylene oxide) (NORYL®), polyetherketone ("Ultrapek"), polyetheretherketone ("Victrex"), poly(butylene terephthalate) ("Valox"), polyarylate (ARYLON®), liquid crystal polymer, polyimide (VESPEL®), polyetherimides ("Ultem"), polyamideimides ("Torlon"), poly(p-phenylene sulfide) ("Rython"), polysulfone ("Udel"), and polyaryl sulfone ("Rydel").

The following examples are representative of the present invention and not to be considered limiting.

EXAMPLES

The non-limiting list of refrigerants used in the following examples includes:

R-404A, a refrigerant blend containing 44% R-125 (pentafluoroethane), 52% R-143a (1,1,1-trifluoroethane), and 4% R-134a (1,1,2-tetrafluoroethane)

R-22 (chloro-difluoromethane)

R-422D, a refrigerant blend containing 65.1% R-125, 31.5% R-134a, and 3.4% R-600a (isobutane).

R-427A, a refrigerant blend containing 15% R-32 (difluoromethane), 25% R-125, 10% R-143a, and 50% R-134a.

R-407C, a refrigerant blend containing 23% R-32, 25% R-125, and 52% R-134a.

The non-limiting list of common lubricating oils used in these examples include:

MO-150: 150 SUS viscosity mineral oil (National Refrigerants Inc., produced by Witco Corp.)

MO-300: 300 SUS viscosity mineral oil (National Refrigerants Inc., produced by Witco Corp.)

MO-70: 70 SUS viscosity mineral oil (Science Lab.com. Light Viscosity Range Mineral Oil NF. CAS# 8012-95-1)

AB-150: 150 SUS viscosity synthetic alkyl benzene oil (National Refrigerants Inc., CAS# 68855-24-3)

POE-22: 22 centistoke viscosity polyol ester oil (Copeland Ultra 22CC, produced by Mobile).

Random Copolymer Oil-Return Additives

The nomenclature to describe random copolymer polymeric oil-return agents is as follows: P(A/Xa-r-B/Xb)-Mn designates a polymer of molecular weight Mn (kg/mol) composed of monomer A and monomer B, where the weight fraction of monomer A in the polymer is Xa and the weight fraction of monomer B in the polymer is Xb. The "r" denotes a random distribution of A and B monomer units within the polymer. For example, P(BA/25-r-LMA/75)-8 denotes a random copolymer containing 25 wt % butyl acrylate and 75 wt % lauryl methacrylate with an overall molecular weight of 8 kg/mol. Table 1 lists the random copolymer polymeric oil-return agents provided in the examples:

TABLE 1

Random Copolymers used in Examples

| Designation | Monomer content (wt %) | | Mw (kg/mol) | F-content |
|---|---|---|---|---|
| | BA | LA | | |
| P(BA/20-r-LA/80)-6 | 20% | 80% | 6 kg/mol | 0% |
| P(BA/50-r-LA/50)-7 | 50% | 50% | 7 kg/mol | 0% |
| P(BA/25-r-LA/75)-8 | 25% | 75% | 8 kg/mol | 0% |

Synthesis of Random Copolymers of Butyl Acrylate and Lauryl Acrylate

Example 1

50 mL of toluene were heated in a 100 ml jacketed reactor with mechanical stirrer, nitrogen inlet, condenser and feed port. Into a 4 oz jar, 10.5 g of butyl acetate, 10.0 g butyl acrylate, 40.0 g lauryl acrylate, and 0.91 g of LUPEROX® 575 (organic peroxide polymerization initiator available from Arkema Inc.) were weighed and primed through a metering pump. Butyl acetate is a non-reactive solvent used as an internal standard for monitoring monomer conversion. When the temperature of the toluene reached 104° C., the feed was started. Feed was complete at 80 minutes and conversion was 93.9%. The reaction was heated to 110° C. and held for 3 hours. Final conversion was 98%. The synthesized polymer contained a monomer composition of 20% butyl acrylate and 80% lauryl methacrylate and an overall molecular weight of Mn=6.2 kg/mol and Mw=11.4 kg/mol as determined by GPC. The polymer is further designated as P(BA/10-r-LA/80)-6

Example 2

50 mL of toluene were heated in a 100 ml jacketed reactor with mechanical stirrer, nitrogen inlet, condenser and feed port. Into a 4 oz jar, 10.0 g of butyl acetate (internal standard), 25.0 g butyl acrylate, 25.0 g lauryl acrylate, and 0.91 g of LUPEROX® 575 were weighed and primed through a metering pump. When the temperature of the toluene reached 104° C., the feed was started. Feed was complete at 80 minutes and conversion was 93.9%. The reaction was heated to 110° C. and held for 3 hours. Final conversion was 98%. The synthesized polymer contained a monomer composition of 20% butyl acrylate and 80% lauryl methacrylate and an overall molecular weight of Mn=6.6 kg/mol and Mw=13.5 kg/mol as determined by GPC. The polymer is further designated as P(BA/50-r-LA/50)-7

Lubricant Preparation:

Lubricants were prepared by blending a fraction of a polymeric oil-return agent to mineral oil (MO-150). Blending could be assisted with gentle heating. Blends were prepared from 0 wt % to 100 wt % polymeric additive in oil. For most lubricants, the blend was prepared at 4% to 5.5 wt % polymer additive. The appearance of lubricants was noted, both just after preparation and up to about one year following preparation. Lubricants that appeared cloudy may remain stable for days or weeks, but after several months most all would display signs of settling or flocculation, evidenced by the lubricant being clear near the surface while becoming cloudier towards the bottom. The cases where the polymeric additive was immiscible with the oil or where it flocculated quickly were also noted.

Refrigerant/Oil Miscibility Test

To determine the miscibility limit of a refrigerant in a lubricant, a known quantity of lubricant was loaded into a calibrated glass pressure vessel. A slight vacuum was pulled on the vessel to remove excess air. Using a high pressure syringe pump, refrigerant was incrementally added to the pressure vessel. After each addition of liquid refrigerant, the refrigerant and lubricant were mixed and then allowed to stand for several minutes after which the number of liquid phases in the pressure vessel was visually observed. The composition where the mixture transitions from one phase to two distinct liquid phases is the miscibility limit, and is reported as the weight percent (wt %) of refrigerant in the liquid composition. The miscibility limit may also be identified by starting with a two-phase mixture containing excess refrigerant whereby refrigerant is carefully vented from the vessel in increments until a one-phase composition is achieved. The miscibility tests of the following examples were conducted at ambient temperature.

Miscibility Improvement using Polymeric Oil-Return Agents:

Comparative Example 3

The miscibility limit of R-404A in mineral oil (MO-150) was measured using the refrigerant/oil miscibility test described previously and was found to be about 5 wt % R-404A in mineral oil.

Example 4

A lubricant was prepared with 5.5 wt % of the P(BA/20-r-LA/80)-6 of example 1 in MO-150. The lubricant was tested using refrigerant/oil miscibility test described previously using R-404A as the refrigerant. The miscibility limit was between 8.5 wt % and 10.0 wt % R-404A in lubricant.

Example 5

A lubricant was prepared with 5.5 wt % of the P(BA/50-r-LA/50)-7 of example 1 in MO-150. The lubricant was tested using refrigerant/oil miscibility test described previously using R-404A as the refrigerant. The miscibility limit was between 6.3 wt % and 8.8 wt % R-404A in lubricant.

Examples 4 and 5 demonstrate that an essentially free of fluorine, random copolymer polymeric oil-return agent significantly increases the miscibility of a fluorinated refrigerant in mineral oil.

Polymeric Oil-Return Agents Containing Fluorine

Examples 6 through 9 employed block and statistical copolymers containing a significant fraction of fluorine of between 31 wt % and 37 wt % and were synthesized using nitroxide mediated controlled radical polymerization. Though not random copolymers they still provide examples for using polymeric oil-return agents with a high fluorine content.

Example 6

A diblock copolymer was prepared with a 5 kg/mol first block of ZONYL®-TA-N (a fluoroacrylate avaliable from DuPont) and a 5 kg/mol second block of lauryl methacrylate. The polymer had an overal fluorine content of 31.8 wt %. The polymer was found to be essentially immiscible in mineral oil.

Example 7

A statistical copolymer of 50 w t% ZONYL®-TM (a fluoromethacrylate from Dupont) and 50 wt % lauryl methacrylate was prepared with an overall molecular weight of 12 kg/mol with an overall fluorine content of 34.4 wt %. When blended from around 4% to 5.5 wt % with MO-150, the lubricant was cloudy and showed excessive flocculation or sedimentation and could not be effectively used in refrigerant/miscibility tests.

Example 8

A statistical copolymer of 58 wt % ZONYL®-TM (a fluoromethacrylate from Dupont) and 42 wt % lauryl methacrylate was prepared with an overall molecular weight of 8 kg/mol with an overall fluorine content of 36.5 wt %. When blended from around 4% to 5.5 wt % with MO-150, the lubricant was cloudy and exhibited significant foaming and excessive flocculation and could not be effectively used in refrigerant/miscibility tests.

Example 9

A lubricant was prepared using the fluorine containing copolymer of example 8 except at only 2.7 wt % in MO-150. The lubricant was less cloudy than example 8 and exhibited less foaming.

The results indicate that a high degree of fluorination can make the polymeric oil-return agent less compatible with the mineral oil.

Refrigeration Equipment Testing

Equipment testing is performed in a environmentally controlled facility that consists of side-by-side insulated chambers designed for the testing of air-conditioning and refrigeration equipment. Each chamber uses independent control systems to regulate temperature, humidity, and airflow to characterize the performance of full-scale HVACR systems under a wide range of environmental conditions. The system was installed with a medium-to-low temperature Walk-in-Cooler type R-22 refrigeration system. This system is driven by a 1-1/2 HP, semi-hermetic, Copeland compressor, with a matched Bohn evaporator and Sporlan thermostatic expansion valve. Pressure transducers and resistance temperature detectors are installed throughout to determine the refrigerant state at key points in the system. A Coriolis meter is used to measure refrigerant flow rates, while wattmeters are used to measure power consumption of the system and its components. Finally, a video camera is used to remotely monitor the oil levels in the compressor sight glass.

System performance can be evaluated at various system conditions. Oil return is evaluated by monitoring the oil level in the compressor sight glass. After startup, the oil level in the compressor may drop below the lower level in the sight glass. If the oil level does not return to within the visible range then additional oil would be added to top off the level in the compressor. If the oil level again dropped below the visible level in the sight glass then the system is considered to fail with respect to oil return. If the oil level stabilized then the system is considered to provide for stable oil return.

Oil logging in the system could also be inferred from the temperature at the evaporator outlet. At equivalent chamber conditions, a lower evaporator outlet is an indication that oil is collecting in and coating the evaporator, insulating it to heat transfer. Therefor, less subcooling between the evaporator outlet and the box temperature is preferred.

Examples 10 to 13

Equipment Tests Using R-404A and R-422D with POE and MO

The testing facility was operated at 80° F. ambient temperature (compressor-side) and 30° F. box temperature (evaporator-side). For comparitive examples 10 and 11, the refrigeration system was charged with R-404A and with POE-22 and MO-150 respectively. For comparitive examples 12 and 13 the refrigertion system was charged with R-422D and with POE-22 and MO-150 respectively. From Table 2, comparative examples 11 and 13 clearly show the problem caused by poor miscibilty between the refrigerant and the lubricant, where the oil return failed and the evaporator outlet temperature and refrigerant mass flow rate were significantly lower than when operated using POE-22 as seen in comparitive examples 10 and 12. Table 2 summarizes the test conditions and results.

TABLE 2

Equipment test results using R-404A and R-422D 80° F. Ambient temperature and 30° F. Box temperature.

| Example | 10 | 11 | 12 | 13 |
|---|---|---|---|---|
| Refrigerant | R-404A | R-404A | R-422D | R-422D |
| Lubricant | POE | MO-150 | POE | MO-150 |
| Mass Flow Rate (lbm/min) | 4.67 | 4.27 | 4.56 | 4.11 |
| Compressor Power (W) | 2495 | 2404 | 2201 | 2073 |
| Evap Outlet Temp (° F.) | 25.57 | 16.73 | 25.03 | 18.39 |
| Oil Return Status | PASS | FAIL | PASS | FAIL |

Equipment Tests using Polymeric Oil-Return Agent:

Example 14

A lubricant is prepared by blending about 5.5 wt % P(BA/25-r-LMA/75)-8 in mineral oil such that the final lubricant viscosity is 32 cSt at 100° F. This lubricant is charged to the refrigeration system compressor. The refrigeration system is charged with R-404A and operated at 80° F. ambient temperature (compressor-side) and 30° F. box temperature (evaporator-side). At steady-state operating conditions, the system oil return is stable, following oil top off, while the system performance, such refrigerant mass flowrate and evaporator outlet temperature, is superior to when the system was operated with mineral oil without the polymeric oil-return agent.

Example 15

A lubricant is prepared by blending about 5.5 wt % P(BA/25-r-LMA/75)-8 in mineral oil such that the final lubricant viscosity is 32 cSt at 100° F. This lubricant is charged to the refrigeration system compressor. The refrigeration system is charged with R-422D and operated at 80° F. ambient temperature (compressor-side) and 30° F. box temperature (evaporator-side). At steady-state operating conditions, the system oil return is stable, following oil top off, while the system performance, such refrigerant mass flowrate and evaporator outlet temperature, is superior to when the system was operated with mineral oil without the polymeric oil-return agent.

Example 16

A lubricant is prepared by blending about 5.5 wt % P(BA/25-r-LA/75)-8 in mineral oil such that the final lubricant viscosity is 32 cSt at 100° F. This lubricant is charged to the refrigeration system compressor. The refrigeration system is charged with R-404A and operated at 80° F. ambient temperature (compressor-side) and 30° F. box temperature (evaporator-side). At steady-state operating conditions, the system oil return is stable, following oil top off, while the system performance, such refrigerant mass flowrate and evaporator outlet temperature, is superior to when the system was operated with mineral oil without the polymeric oil-return agent.

Example 17

A lubricant is prepared by blending about 5.5 wt % P(BA/25-r-LA/75)-8 in mineral oil such that the final lubricant viscosity is 32 cSt at 100° F. This lubricant is charged to the refrigeration system compressor. The refrigeration system is charged with R-422D and operated at 80° F. ambient temperature (compressor-side) and 30° F. box temperature (evaporator-side). At steady-state operating conditions, the system oil return is stable, following oil top off, while the system performance, such refrigerant mass flowrate and evaporator outlet temperature, is superior to when the system was operated with mineral oil without the polymeric oil-return agent.

The invention claimed is:
1. A refrigerant composition, comprising:
   (a) a halogenated hydrocarbon containing at least one carbon atom and at least one fluorine atom;
   (b) at least one oil selected from the group consisting of paraffin oils, naphthene oils, aromatic oils, alkylaryl oils, synthetic paraffin oil s and polyalphaolefin oils; and
   (c) a polymeric oil-return agent comprising a random copolymer free of fluorine and consisting of at least two different monomer types selected from the goup consisting of butyl acrylate, lauryl acrylate and lauryl methacrylate.

2. The refrigerant composition of claim 1 wherein said polymeric oil-return agent comprises said acrylate monomers and said methacrylate monomers in a ratio of from about 1:20 to 20:1.

3. The refrigerant composition of claim 1 wherein said polymeric oil-return agent comprises said acrylate monomers and said methacrylate monomers in a ratio of from 1:10 to 2:1.

4. The refrigerant composition of claim 1 wherein said polymeric oil-return agent comprises said acrylate monomers and said methacrylate monomers in a ratio of from 1:10 to 1:1.

5. The refrigerant composition of claim 1 wherein said polymeric oil-return agent has an average molecular weight of from about 1 kg/mol to about 50 kg/mol.

6. The refrigerant composition of claim 1 wherein said polymeric oil-return agent has an average molecular weight of from about 1 kg/mol to about 20 kg/mol.

7. The refrigerant composition of claim 1 wherein the combination of oil (b) and polymeric oil-return agent (c) comprises from about 0.01 wt % to about 99 wt % polymeric oil-return agent.

8. The refrigerant composition of claim 1 wherein the combination of oil (b) and polymeric oil-return agent (c) comprises from about 0.1 wt % to about 75 wt % polymeric oil-return agent.

9. The refrigerant composition of claim 1 wherein the combination of oil (b) and polymeric oil-return agent (c) comprises from about 0.2 wt % to about 20 wt % polymeric oil-return agent.

10. The refrigerant composition of claim 1 wherein the combination of oil (b) and polymeric oil-return agent (c) comprises from about 0.4 wt % to about 15 wt % polymeric oil-return agent.

11. The refrigerant composition of claim 1 wherein the combination of oil (b) and polymeric oil-return agent (c) comprises from about 1 wt % to about 15 wt % polymeric oil-return agent.

12. The refrigerant composition of claim 1 wherein the fraction of oil (b) and polymeric oil-return agent (c) comprises from about 2 wt % to about 8 wt % polymeric oil-return agent.

13. The refrigerant composition of claim 1 where the halogenated hydrocarbon is selected from the group consisting of hydrofluorocarbons, hydrofluoroolefins, and mixtures thereof.

14. The refrigerant composition of claim 13 where the halogenated hydrocarbon contains from 1 to 4 carbon atoms.

15. The refrigerant composition of claim 13 where the hydrofluorocarbon is selected from the group consisting of difluoromethane, 1,1-difluoroethane, 1,2-difluoroethane, 1,1,1,2-tetrafluoroethane, 1,1,2,2-tetrafluoroethane, 1,1,1-trifluoroethane, 1,1,2-trifluoroethane, 1,1,1,2,2-pentalluoroethane, 1,1,1,2,3,3,3-heptafluoropropane, fluorocyclopropane, 1,1-difluorocyclopropane, 1,1,2-trifluorocyclopropane, 1,1,2,2-tetrafluorocyclopropane, 1-trifluoromethyl-1,2,2-trifluorocyclopropane, and mixtures thereof.

16. The refrigerant composition of claim 9 wherein the hydrofluoroolefin is selected from the group consisting of 3,3,3-trifluoropropene, 2,3,3,3-tetrafluoropropene, E-1,3,3,3-tetrafluoropropene, Z-1,3,3,3-tetrafluoropropene, E-1,2,3,3,3-pentafluoropropene, Z-1,2,3,3,3-pentafluoropropene, E-1,1,1,4,4,4-hexafluorobut-2-ene, Z- E-1,1,1,4,4,4-hexafluorobut-2-ene, 1,1,1,2,4,4,4-heptafluorobutene, and mixtures thereof.

17. The refrigerant composition of claim 1 further comprising a hydrocarbon.

18. The refrigerant composition of claim 17 wherein said hydrocarbon comprises propane, butane, isobutane, normal pentane, neopentane, cyclopentane, isopentane, and mixtures thereof.

19. A polymeric oil-return agent concentrate comprising greater than 50 wt % of polymeric oil-return agent comprising a random copolymer free of fluorine and consisting of at least two different monomer types selected from the group consisting of butyl acrylate, lauryl acrylate and lauryl methacrylate and mineral oil and/or alkyl benzene oil.

20. A method of improving oil return in a heat transfer system containing a halogenated hydrocarbon containing at least one carbon atom and at least one fluorine atom; and at least one oil selected from the group consisting of paraffin oils, naphthene oils, aromatic oils, alkylaryl oils, synthetic paraffin oil s and polyalphaolefin oils comprising adding thereto a polymeric oil-return agent comprising a random copolymer free of fluorine and consisting of at least two different monomer types selected from the group consisting of butyl acrylate, lauryl acrylate and lauryl methacrylate.

* * * * *